Nov. 8, 1938.   J. S. STEVENSON   2,135,605
SEPARATION OF SODIUM CARBONATE
Original Filed Nov. 10, 1930
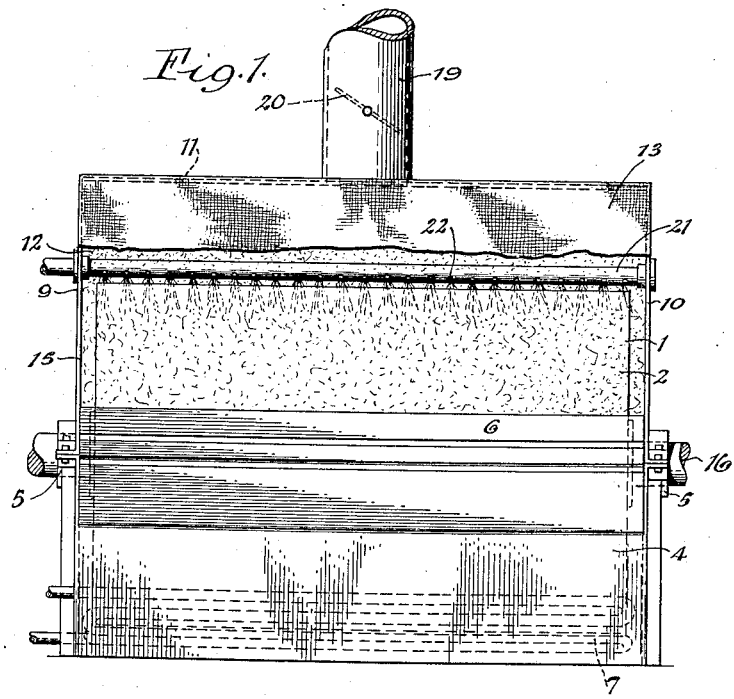
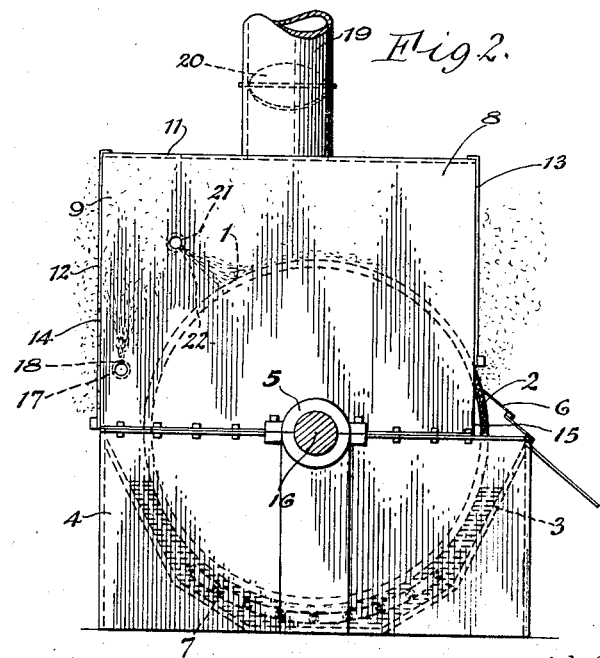
Inventor
John S. Stevenson
by
Attorney Patented Nov. 8, 1938

2,135,605

UNITED STATES PATENT OFFICE 2,135,605

SEPARATION OF SODIUM CARBONATE

John Stuart Stevenson, Buffalo, N. Y., assignor to National Aniline and Chemical Company, Inc., New York, N. Y., a corporation of New York Application November 10, 1930, Serial No. 494,762
Renewed January 6, 1936

23 Claims. (Cl. 23—63)

This invention relates to the separation of sodium carbonate in the form of solid particles or crystals from aqueous solutions thereof, more particularly from saturated aqueous solutions thereof which contain caustic alkali, and includes improvements in the method of crystallizing sodium carbonate, and in the method of washing solid particles or crystals of sodium carbonate to remove mother-liquor or other impurities adhering to the surface thereof. In its more specific aspects, the invention is concerned with the separation and recovery of sodium carbonate, on the one hand, and concentrated aqueous solutions of sodium and potassium hydroxides, on the other hand, from a mixture resulting from the carbonation of an aqueous solution of a mixture of sodium and potassium hydroxides.

Sodium carbonate, which is obtained as the main product of a wide variety of processes, is also a by-product of some other processes, and is frequently obtained in the form of an aqueous solution which contains caustic alkali. In the interest of economy, it is often necessary that the sodium carbonate and caustic alkali be each separately recovered from such solutions. One well-known method of effecting the recovery consists in evaporating the aqueous solution to form a saturated solution of sodium carbonate, cooling the solution to effect crystallization of the sodium carbonate, filtering off the sodium carbonate crystals from the caustic alkali mother-liquor, drying the crystals, and evaporating the mother-liquor to recover the caustic alkali. This procedure is open to the objection, however, that the sodium carbonate recovered contains caustic alkali which adheres to the crystals and is not removed by filtration; thereby causing contamination of the sodium carbonate, and a loss of caustic alkali.

To illustrate: in the manufacture of certain organic chemical products, such as synthetic indigo, a sodium compound of one intermediate product, such as sodamide, is heated with a potassium compound of another intermediate product, such as potassium phenylglycinate, and a fused mixture of sodium and potassium hydroxides; the fusion mass is diluted with water; and the product is recovered, leaving a solution of mixed caustic alkalis and impurities. In order to reuse the sodium and potassium hydroxides which are contained in the residual solution for a subsequent repetition of the process, the desired ratio of sodium and potassium hydroxides, which has been disturbed by the reaction, must be restored. This is accomplished, in accordance with one well-known method, by removing a portion of the sodium hydroxide in the form of sodium carbonate; for example by treating the liquor with carbon dioxide (flue gas), concentrating the resulting mixture by evaporation, separating by filtration the sodium carbonate which is obtained to the substantial exclusion of potassium carbonate, and drying the filter-cake. The resulting sodium carbonate contains, in addition to a small amount of potassium carbonate, sodium and potassium hydroxides.

The loss of caustic alkali is particularly important in those processes, such as the one above mentioned, in which sodium carbonate (mixed with a small amount of potassium carbonate) is recovered from an aqueous solution of a mixture of sodium and potassium hydroxides, owing to the relatively high value of potassium hydroxide.

It has heretofore been proposed to recover the mixed caustic alkali, retained by the crystals of sodium carbonate, by washing the crystals with water, or with a concentrated aqueous solution of sodium hydroxide. Washing with water has the objections, however, that the mass of crystals forms a sort of glaze with the water, setting or "freezing" to a hard, impervious mass which resists further filtration and washing; and, in addition, the water dissolves some of the sodium carbonate and dilutes the recovered caustic alkali solution. Washing with aqueous sodium hydroxide, while it does not cause "freezing," is of little benefit; owing to the fact that it merely effects a replacement of the potassium hydroxide by sodium hydroxide, but does not purify the sodium carbonate.

An object of the present invention is to provide a method for the separation and recovery of sodium carbonate in the form of solid particles or crystals from aqueous solutions thereof which contain caustic alkali, whereby the quantity of aqueous caustic alkali solution adhering to the solid sodium carbonate may be reduced to a minimum substantially without the formation of a hard, impervious, glass-like mass.

Another object of the present invention is to recover caustic alkali from sodium carbonate in the form of solid particles or crystals having aqueous caustic alkali solution adhering thereto, while preventing the formation of a hard, impervious, glass-like mass.

A further object of the invention is to provide a simple and efficient method for removing caustic alkali mother-liquor contained in a mass of solid particles or crystals of sodium carbonate, resulting from the carbonation of an aqueous solution of mixed sodium and potassium hydroxides followed by crystallization and filtration, while dissolving a minimum quantity of sodium carbonate.

An additional object of the invention is to provide a simple and efficient method for removing residual caustic alkali mother-liquor contained in a mass of solid particles or crystals of sodium carbonate, resulting from the carbonation of an aqueous solution of mixed sodium and potassium hydroxides followed by crystallization and filtration, without substantially increasing the dilution of the caustic alkali solution contained in the residual mother-liquor.

Another object of the invention is to provide a process for the crystallization of sodium carbonate from aqueous solutions thereof whereby the sodium carbonate is obtained in the form of solid particles or crystals which filter readily and which readily lose adhering mother-liquor when treated on the filter with dry steam at an elevated temperature.

Other objects of the invention will in part be obvious and will in part appear hereinafter.

With these objects in view, the invention comprises the several steps and the relation of one or more of such steps with respect to others thereof which will be exemplified in the process hereinafter disclosed. The scope of the invention will be indicated in the claims.

According to the present invention, aqueous solutions, particularly aqueous caustic alkali solutions, adhering to sodium carbonate in the form of solid particles or crystals, or present in the interstices between particles of a mass thereof, are removed from said sodium carbonate by subjecting the sodium carbonate to the action of steam while withdrawing liquid from the particles or mass and while maintaining the particles or mass under elevated temperature conditions, preferably under temperature conditions unfavorable to the existence of a hydrate of sodium carbonate containing more than one molecule of water. I have found, if a filter-cake of sodium carbonate, in the form of solid particles or crystals having aqueous solution adhering thereto and resulting from the separation by filtration of sodium carbonate crystals from a saturated aqueous solution thereof, is subjected to the action of steam while withdrawing liquid from the mass and while maintaining the mass under temperature conditions unfavorable to the existence of a hydrate of sodium carbonate containing more than one molecule of water, that the formation of a hard, impervious, glass-like mass is substantially avoided.

Furthermore, according to the present invention, an admixture of solid sodium carbonate with water containing sodium carbonate and caustic alkali in solution is maintained under conditions unfavorable to the existence of sodium carbonate in the form of a solid containing more than one molecule of water, preferably until substantially the whole of the solid sodium carbonate is in the form of the anhydrous salt or of a hydrate which contains not more than one molecule of water. I have found that in general the resulting mixture filters more rapidly, the resulting filter-cake contains less of the solution, and the resulting filter-cake loses adhering solution more readily, when treated with steam in the manner herein described, than a filter-cake resulting from the filtration of the mixture without said treatment.

In the practice of the present invention, sodium carbonate, which is in the form of solid particles or crystals having adhering thereto an aqueous solution of sodium carbonate and caustic alkali, may be formed into a mass, a greater pressure may be applied to one side of the mass than to the other side of the mass, and dry steam may be brought into contact with the side of the mass under the greater pressure, while maintaining the mass at an elevated temperature, preferably not less than the lowest temperature at which sodium carbonate will separate from said solution in the form of a hydrate containing not more than one molecule of water per molecule of sodium carbonate. As the result of this procedure, a purified sodium carbonate may be recovered, on the one hand, and caustic alkali solution may be recovered, on the other hand, substantially without formation of a hard, impervious, glass-like mass.

Furthermore, in the practice of the present invention, the particles of sodium carbonate may be obtained in a form particularly adapted for the steam treatment by maintaining a mixture of sodium carbonate in the solid form admixed with an aqueous solution of sodium carbonate and caustic alkali at a temperature which is favorable for the existence of the solid carbonate in the form of the anhydrous salt or of a hydrate containing not more than one molecule of water, but which is unfavorable for the existence of the solid sodium carbonate in the form of a hydrate containing more than one molecule of water, and separating the solid sodium carbonate from the solution. The mixture preferably may be maintained at the required temperature for a sufficient time to enable the establishment of an equilibrium mixture in which substantially all of the solid sodium carbonate is in the form of the anhydrous salt or of a hydrate which contains not more than one molecule of water. The temperature above which the mixture preferably should be maintained will vary with the concentrations of the various ingredients of the mixture, being lower with higher concentrations of caustic alkali; since, as is well known to those skilled in the art, the temperature at which sodium carbonate will exist in the form of a stable solid of a particular composition in equilibrium with an aqueous solution of caustic alkali and sodium carbonate is dependent upon the concentrations of the caustic alkali and sodium carbonate in the solution. Temperatures which favor the existence of a stable system in which the solid sodium carbonate is in the most dehydrated form are preferred. The separation of the solid from the solution may be made by filtration, centrifugation, and the like; it preferably should be effected before the mixture has cooled sufficiently for a substantial portion of the solid sodium carbonate to become converted to a hydrate containing more than one molecule of water per molecule of sodium carbonate.

In carrying out the steam treatment in accordance with a preferred method of procedure, sodium carbonate, in the form of solid particles or crystals, in admixture with sodium carbonate and sodium hydroxide in aqueous solution may be filtered with the aid of suction, which may be maintained until a filter-cake is obtained from which no more solution can be withdrawn. The filter-cake then may be heated to a temperature which is unfavorable for the existence in the filter-cake of a hydrate of sodium carbonate containing more than one molecule of water (if not already at such a temperature), and steam may be brought into contact with the filter-cake while maintaining the suction. A second filtrate may be thus obtained similar to the first filtrate. The filter-cake then may be dried or further treated in any desired manner. It contains a considerably smaller amount of sodium hydroxide than it did before it was subjected to the treatment with steam.

The particular temperature above which the filter-cake preferably should be maintained during the steam treatment also will vary with the concentrations of the caustic alkali and of the sodium carbonate in the solution present in the filter-cake. The minimum temperature preferably employed is the lowest temperature at which sodium carbonate is capable of existing in the form of a solid containing not more than one molecule of water per molecule of sodium carbonate in stable equilibrium with a solution having the composition of the solution present in the filter-cake. For optimum operation, those temperatures are employed which lie above the lowest temperature at which sodium carbonate is capable of existing in the form of a solid containing less than one molecule of water per molecule of sodium carbonate in stable equilibrium with a solution having the composition of the solution present in the filter-cake.

Without limiting the invention to any particular theory as to the manner in which the steam treatment effects the elimination of solution retained by the filter-cake, I regard the steam treatment as a displacement of the retained solution by a solution of sodium carbonate formed as the result of the condensation of steam in the filter-cake.

The aqueous solution, or second filtrate, recovered from the steam treatment may be added to the original filtrate for further treatment; as I have found that the difference in dilution between the original filtrate and the filtrate resulting from said treatment of the filter-cake with steam is not sufficiently great to seriously affect the concentration of the original filtrate. It may be separately collected and treated, if desired, however.

In the practical application of the invention, the treatment with steam may be carried out in conjunction with the separation of the sodium carbonate from the solution by filtration. Thus, the mixture to be filtered, containing sodium carbonate in the solid form and an aqueous solution of sodium carbonate and sodium hydroxide, may be heated at least to a temperature unfavorable for the existence of a solid hydrate of sodium carbonate containing more than one molecule of water, the heated mixture may be filtered at said temperature or a higer temperature with the aid of suction or pressure, and the filter-cake may be treated at said temperature with dry steam, while still on the filter and still subjected to the pressure or suction.

The filter-cake may be maintained at the desired temperature during the steam treatment by suitably preheating the mixture before filtration, and/or by maintaining the mixture and the filtering apparatus at a suitable elevated temperature during the filtration, and/or by employing superheated steam. Preheating of the mixture, maintenance of the mixture and the apparatus at a suitable high temperature during the filtration, and the employment of superheated steam are all preferably included in the operation of the process.

With mixtures containing sodium carbonate in the form of solid particles or crystals admixed with aqueous solutions thereof containing caustic alkali, which mixtures contain about 40 to 60 per cent. of caustic alkali, temperatures may be employed of about 50° to 150° C., and preferably about 70° to 120° C., particularly in those cases wherein the caustic alkali is a mixture of sodium and potassium hydroxides containing about 40 to 60 per cent. of sodium hydroxide.

The employment of higher temperatures, rather than temperatures approaching the lower limiting conditions set forth, is preferred not alone because of the greater operating efficiency which results therefrom, but also because the sodium hydroxide solutions obtained as filtrates at the higher temperatures contain a relatively smaller amount of sodium carbonate than the filtrates obtained at lower temperatures, owing to the lower solubility of sodium carbonate in aqueous caustic solutions at higher temperatures than at lower temperatures.

One form of apparatus suitable for practicing the process above described is illustrated in the accompanying drawing in which—

Figure 1 is a front view of the apparatus, and
Figure 2 is a side view of the apparatus.

This apparatus comprises a rotary drum, suction filter of the "Oliver" type having a rotating hollow cylindrical drum 1 carrying a filtering medium 2 on its outer periphery and dipping within a trough 3 containing the liquid to be filtered (cf. U. S. P. 919,628). The trough 3 is located within a suitable housing 4, which encloses the lower portion of the drum and contains bearings 5 in which the drum is mounted for rotation by suitable driving means (not shown). The usual means for agitating the liquid in the trough 3, and for applying vacuum to the interior surface of the filtering medium, together with the valve mechanism for operating said vacuum-applying means, (not shown) are also provided.

A knife or scraper 6, adapted to scrape filtered material from the rotating drum, is mounted at the front of the enclosure 4. Suitable heating means, shown as coils 7 adapted to contain steam under pressure, are provided in the trough 3 for heating the material in said trough.

The upper portion of the drum is partially enclosed by a hood 8 adapted substantially to exclude air from the filter while permitting discharging the filter-cake from the drum 1 under atmospheric pressure. The hood 8 is formed of two walls 9 and 10, extending upward from the sides of the housing 4, a top 11, joining the upper ends of the side walls 9 and 10, a rear curtain 12, and a front curtain 13. The side walls 9 and 10 are of such a width and are located in such a manner that their rear edges 14 are behind the drum 1, but their front edges 15 are between the scraper 6 and the axis 16 of the drum; so that the drum is wholly enclosed by the hood 8 and housing 4, with the exception of a portion in the vicinity of the scraper 6. The curtains 12 and 13 are suitably secured to the top 11, are weighted to hang downward against the edges 14 and 15, respectively, of the side walls 9 and 10, while yet being capable of being rolled back so as to render the upper portion of the drum accessible for inspection or manipulation, and are formed of suitable flexible water-proof material, such as rubber, rubberized fabric, or like material which is adapted to retain steam within the hood or enclosure 8. A pipe 17, connected with a suitable source of steam under pressure and having suitable openings 18 within the hood 8, serves to displace air from within the hood 8 and to maintain the apparatus at the desired elevated temperature. The top 11 is provided with a flue 19, which is adapted to remove excess steam from the hood 8 and is provided with a damper 20 for controlling the draft in said flue.

A pipe 21, connected with a source of steam under pressure and having a plurality of openings 22, is mounted in the walls 9 and 10 above the drum 1 to project a stream of superheated steam from the openings 22 onto the filter-cake in the direction of rotation of the drum.

The operation of the apparatus will be explained in connection with the following specific example which illustrates one manner of practicing the invention.

*Example.*—A mixture comprising solid particles or crystals of sodium carbonate and potassium carbonate, and water containing in solution sodium carbonate, potassium carbonate, sodium hydroxide and potassium hydroxide (which mixture contains 8 per cent. of sodium carbonate, 0.2 per cent. of potassium carbonate, 17.8 per cent. of sodium hydroxide, 26.5 per cent. of potassium hydroxide and the rest water, and which mixture has been produced by passing carbon dioxide gas into an aqueous solution of a mixture of sodium and potassium hydroxides followed by concentrating the resulting solution by heating under vacuum to precipitate the sodium carbonate) is heated at a temperature of about 70° to 120° C., preferably about 100° C., for a period of about 6 to 12 hours. The hot mixture is then charged into the trough 3 of the filtering apparatus, hereinbefore described, and agitation is initiated.

The temperature of the mixture in the trough 3 is maintained at about 70° to 120° C., preferably 100° C., by means of the heating coils 7, and the filter is put into operation. Filtration under a vacuum, for example, of about 23 inches of mercury, is allowed to proceed, without removal of filter-cake until a layer of filter-cake has been built up on the filtering medium 2 of the desired thickness, as for example, one-fourth inch. The scraper 6 is then adjusted to remove filter-cake in excess of the desired thickness. An analysis of the resulting filter-cake shows it to contain 51.04 per cent. of $Na_2CO_3$, 0.52 per cent. of $K_2CO_3$, 9.35 per cent of NaOH, 13.05 per cent of KOH, and 20.25 per cent. of water.

High-pressure steam (45 to 100 pounds per square inch gage pressure) is then allowed to flow from the pipe 21. The free expansion of the high-pressure steam through the openings 22 of the pipe 21 causes it to become superheated, and the resulting superheated steam striking the filter-cake and passing over the surface thereof is forced or drawn into the cake with the aid of the reduced pressure existing on the interior side of the cake.

The hood 8 prevents the cool surrounding air from coming in contact with, and cooling, the filter-cake during the treatment; and, if the pipe 21 does not supply an amount of steam to the interior of the hood 8 sufficient substantially to exclude air, additional steam is admitted through the pipe 17.

The speed of rotation of the drum, and the vacuum applied to the filter-cake are so correlated that the bulk of mother-liquor capable of being withdrawn from the filter-cake by the existing suction is withdrawn before the filter-cake reaches the steam blast from pipe 21. The location of the pipe 21 relative to the drum 1, and the steam pressure employed are preferably such that substantially no condensation of steam occurs before the steam from the pipe 21 reaches the filter-cake. During the steam treatment additional filtrate is withdrawn from the filter-cake, and it is added to the first filtrate, as the two are of substantially the same concentration.

Continuous filtration thus can be effected without formation of the filter cake into a glaze; filter-cake being removed by the knife 6 as it builds up on the drum, and additional mixture being added to the trough 3 as required. An analysis of the filter-cake resulting from the steam-treatment shows it to contain 49.31 per cent. of $Na_2CO_3$, 0.49 per cent. of $K_2CO_3$, 7.52 per cent. of NaOH, 10.50 per cent. of KOH, and 26.65 per cent. of water. Thus about 20 per cent. of the caustic alkali left in the filter-cake has been eliminated as the result of the steam treatment, thereby increasing the purity of the sodium carbonate and at the same time reducing the loss of caustic alkali. In addition, the steam treatment effects a purification of the sodium carbonate from potassium carbonate owing to the higher solubility in water of potassium carbonate than sodium carbonate.

It will be realized that the invention is not limited to the process and the details thereof set forth in the above specific example. Thus, the invention is not limited to the treatment of a mixture of a solution of caustic alkali and solid particles or crystals of sodium carbonate obtained by the carbonation of an aqueous solution of mixed sodium and potassium hydroxides, but it may be applied to the removal of caustic alkali solutions from solid particles or of sodium carbonate obtained in other ways. It is particularly useful, however, in the treatment of such a mixture.

In the operation of the apparatus above described a reduction in the caustic alkali content of the filter-cake may be secured by the employment of steam in the hood 8 alone; thus, steam may be supplied to the hood from the pipe 17 without employing steam from the pipe 21. The employment is preferred of a blast of superheated steam contacting the cake, such as the steam from pipe 21; inasmuch as a greater reduction in the caustic alkali content of the filter-cake is effected thereby.

The invention also may be carried into practice by causing the sodium carbonate, when originally produced, to separate in the form of the anhydrous salt or a hydrate which contains not more than one molecule of water, preferably the anhydrous salt, filtering the resulting mixture with the aid of suction or pressure while maintaining temperature conditions adapted to maintain the solid sodium carbonate in said form, and treating the filter-cake with steam under the conditions hereinbefore described. Thus, a mixture of sodium carbonate and caustic alkali in aqueous solution may be concentrated to produce a precipitate of sodium carbonate in the form of solid particles or crystals, for example, by evaporating the solution, preferably under subatmospheric pressure, at a temperature favorable to the precipitation of sodium carbonate in the form of a solid containing not more than one molecule of water per molecule of sodium carbonate, the concentrated mixture then may be maintained, for a sufficient time to complete the precipitation of the sodium carbonate, at a temperature suitable for the existence of sodium carbonate in the form of solid particles or crystals containing not more than one molecule of water per molecule of sodium carbonate in stable equilibrium with a solution having the composition of the mother-liquor, the resulting precipitate may then be separated from the mixture while maintaining temperature conditions adapted to keep the sodium carbonate in the form in which it was precipitated, and the resulting mass of separated solid particles of sodium carbonate may then be treated with steam in the manner hereinbefore described to remove residual mother-liquor adhering to said particles. With aqueous solutions containing sodium carbonate and a mixture of sodium and potassium hydroxides, which mixture contains about 40 to 60 per cent. of sodium hydroxide, the evaporation and precipitation preferably may be obtained by heating the solution under subatmospheric pressure at a temperature of about 70° to 120° C.

It is not essential to the invention that a maximum amount of caustic alkali adhering to the crystals of the sodium carbonate be removed by the steam treatment, although for economical operation it is preferable that the maximum amount of the caustic alkali be displaced and recovered. The steam treatment also may be performed in such a manner that the liquid removed from the filter-cake as a second filtrate is of greater dilution than the original filtrate. It is preferably carried to such an extent, however, that the second filtrate is of substantially the same concentration as the original filtrate, so that they may be mixed without increasing the dilution of the latter.

The invention also may be applied for the removal of liquid retained by crystalline material other than sodium carbonate which when washed with water leads to the production of hydrates which form a glaze.

Various types of apparatus may be employed for carrying out the process, as for example, a suction filter of the nutsch type, of the "Oliver" type, enclosed pressure filters, etc.

Since changes in the carrying out of the above process may be made without departing from the scope of the invention, it is intended that all matter contained in the above description and shown in the accompanying drawing shall be interpreted as illustrative and not in a limiting sense, except as limited by the claims.

It is also to be understood that the following claims are intended to cover, in addition to the generic and specific features of the invention herein described, all statements of the scope of the invention which, as a matter of langauge, might be said to fall therebetween.

I claim:

1. In the removal of residual aqueous solution from a pervious mass of a solid substance in the form of particles having said solution adhering thereto, said substance being capable of forming higher hydrates with water and setting to a hard, impervious mass, the improvement which comprises displacing residual aqueous solution from said mass by water supplied in the form of steam while maintaining the mass at a temperature above the lowest temperature at which the substance is capable of existing in stable equilibrium with a solution having the composition of said aqueous solution in the form of a solid which does not form a hard, impervious mass.

2. In the removal of residual aqueous solution from a pervious mass of a solid substance in solid form having said solution adhering thereto, said substance being capable of forming higher hydrates with water and setting to a hard, impervious mass, the improvement which comprises treating said mass with steam while withdrawing liquid therefrom and while maintaining the temperature above the lowest temperature at which the substance is capable of existing in stable equilibrium with a solution having the composition of said aqueous solution in the form of a solid which does not form a hard, impervious mass.

3. In the removal of aqueous sodium carbonate solution from a pervious mass of solid particles or crystals of sodium carbonate having said solution adhering to said particles, said sodium carbonate crystals containing not more than one molecule of water of crystallization, the improvement which comprises displacing said aqueous sodium carbonate solution from said mass by water supplied in the form of steam while maintaining the sodium carbonate at a temperature not less than the lowest temperature at which sodium carbonate is capable of existing in the form of a solid containing not more than one molecule of water per molecule of sodium carbonate in equilibrium with a solution having the composition of the solution adhering to said particles.

4. In the removal of aqueous sodium carbonate solution containing caustic alkali from solid particles or crystals of sodium carbonate having said solution adhering thereto, the improvement which comprises treating said sodium carbonate particles with dry steam while withdrawing liquid therefrom and while maintaining the sodium carbonate at a temperature not less than the lowest temperature at which sodium carbonate is capable of existing in the form of a solid containing not more than one molecule of water per molecule of sodium carbonate, in equilibrium with a solution having the composition of the solution adhering to said particles.

5. In the removal of aqueous sodium carbonate solution containing caustic alkali from solid particles or crystals of sodium carbonate having said solution adhering thereto, said sodium carbonate crystals containing not more than one molecule of water of crystallization, the improvement which comprises forming said particles into a pervious mass, and applying steam to said mass and withdrawing liquid therefrom while maintaining the mass at a temperature not less than the lowest temperature at which sodium carbonate is capable of existing in the form of a solid containing not more than one molecule of water per molecule of sodium carbonate in equilibrium with a solution having the composition of the solution contained in said mass of particles.

6. In the removal of aqueous sodium carbonate solution containing caustic alkali from a mass of solid particles or crystals of sodium carbonate having said solution adhering thereto, the improvement which comprises forming said mass of particles into a pervious sheet, applying a greater pressure to one side of said sheet than to the other side of said sheet, applying steam to the side under the greater pressure while maintaining the sheet at a temperature not less than the lowest temperature at which sodium carbonate is capable of existing in the form of a solid containing not more than one molecule of water per molecule of sodium carbonate in equilibrium with a solution having the composition of the solution contained in said mass of particles, and withdrawing liquid from the mass.

7. In the removal of an aqueous solution containing sodium and potassium hydroxides from a mass of solid particles or crystals of sodium carbonate and potassium carbonate having said solution adhering thereto, the improvement which comprises forming said mass of particles into a sheet, applying suction to one side of said sheet to withdraw liquid therefrom, and applying dry steam to the other side of said sheet while maintaining the sheet at a temperature not less than the lowest temperature at which sodium carbonate is capable of existing in the form of a solid containing less than one molecule of water per molecule of sodium carbonate, in equilibrium with a solution having the composition of the solution contained in said mass of particles.

8. In the removal of an aqueous solution containing sodium carbonate and a mixture of sodium and potassium hydroxides, of which mixture about 40 to about 60 per cent. is sodium hydroxide, from a filter-cake of sodium carbonate crystals having said solution adhering thereto, said sodium carbonate crystals containing not more than one molecule of water of crystallization, the improvement which comprises treating said filter-cake with dry steam while removing liquid therefrom and while maintaining the filter-cake at a temperature of about 70° to about 120° C.

9. In the separation of solid particles or crystals of sodium carbonate from a mixture thereof with an aqueous solution containing sodium carbonate and caustic alkali, the latter being present in an amount substantially in excess of that resulting from hydrolysis of the sodium carbonate, the improvement which comprises maintaining said mixture at a temperature not less than the lowest temperature at which sodium carbonate is capable of existing in the form of a solid containing not more than one molecule of water per molecule of sodium carbonate in stable equilibrium with a solution having the composition of said solution, and filtering off said solid sodium carbonate while maintaining the mixture at a temperature not less than said lowest temperature.

10. In the separation of solid particles or crystals of sodium carbonate from a mixture thereof with an aqueous solution containing sodium carbonate and caustic alkali, the caustic alkali constituting about 40 to about 60 per cent of said mixture, the improvement which comprises maintaining said mixture at a temperature not less than the lowest temperature at which sodium carbonate is capable of existing in the form of a solid containing not more than one molecule of water per molecule of sodium carbonate in stable equilibrium with a solution having the composition of said solution, and filtering off said solid sodium carbonate while maintaining the mixture at a temperature not less than said lowest temperature.

11. In the separation of solid particles or crystals of sodium carbonate from a mixture thereof with an aqueous solution containing sodium and potassium hydroxides, said hydroxides jointly constituting about 40 to about 60 per cent of said mixture, the improvement which comprises maintaining said mixture at a temperature not less than the lowest temperature at which sodium carbonate is capable of existing in the form of a solid containing less than one molecule of water per molecule of sodium carbonate in stable equilibrium with a solution having the composition of said solution, and filtering off said solid sodium carbonate while maintaining the mixture at said temperature.

12. In the separation of solid particles or crystals of sodium carbonate from a mixture thereof with an aqueous solution containing sodium carbonate, the improvement which comprises maintaining said mixture at a temperature not less than the lowest temperature at which sodium carbonate is capable of existing in the form of a solid containing not more than one molecule of water per molecule of sodium carbonate in stable equilibrium with a solution having the composition of said solution, separating said solid particles of sodium carbonate from said solution while maintaining the mixture at a temperature not less than said lowest temperature, and subjecting the resulting mass of separated particles to the action of steam while withdrawing liquid therefrom and while maintaining said mass at an elevated temperature.

13. In the separation of solid particles or crystals of sodium carbonate from a mixture thereof with an aqueous solution containing caustic alkali, the improvement which comprises maintaining said mixture at a temperature not less than the lowest temperature at which sodium carbonate is capable of existing in the form of a solid containing not more than one molecule of water per molecule of sodium carbonate in stable equilibrium with a solution having the composition of said solution, separating said solid particles of sodium carbonate while maintaining the mixture at a temperature not less than said lowest temperature, forming the separated solid particles into a pervious mass, applying a greater pressure to one side of said mass than to the other side of said mass, and applying steam to the side under the greater pressure while withdrawing liquid from said mass and while maintaining the mass at a temperature not less than the lowest temperature at which sodium carbonate is capable of existing in the form of a solid containing not more than one molecule of water per molecule of sodium carbonate in stable equilibrium with a solution having the composition of the solution contained in said mass of particles.

14. In the separation of solid particles or crystals of sodium carbonate from a mixture thereof with an aqueous solution containing sodium and potassium hydroxides, the improvement which comprises maintaining said mixture at a temperature not less than the lowest temperature at which sodium carbonate is capable of existing in the form of a solid containing less than one molecule of water per molecule of sodium carbonate in stable equilibrium with a solution having the composition of said solution, filtering off said solid sodium carbonate while maintaining the mixture at said temperature, applying suction to one side of said filter-cake to withdraw liquid therefrom, and applying dry steam to the other side of said filter-cake while maintaining said mixture at a temperature not less than the lowest temperature at which sodium carbonate is capable of existing in the form of a solid containing less than one molecule of water per molecule of sodium carbonate in stable equilibrium with a solution having the composition of the solution contained in the filter-cake.

15. In the separation of solid particles or crystals of sodium carbonate from an aqueous solution containing sodium and potassium hydroxides included in a mass of said particles, the improvement which comprises maintaining at a temperature of about 50° to about 150° C. a mixture of sodium carbonate, potassium carbonate, sodium hydroxide, potassium hydroxide and water, said mixture containing sodium carbonate in the form of solid particles and about 40 to about 60 per cent. of mixed sodium and potassium hydroxides, filtering off the solid sodium carbonate at a temperature of about 50° to about 150° C., applying suction to one side of the resulting filter-cake to withdraw liquid therefrom, and applying dry steam to the other side of said filter-cake while withdrawing liquid and while maintaining the filter-cake at a temperature of about 50° to about 150° C.

16. In the separation of solid particles or crystals of sodium carbonate from an aqueous solution containing sodium and potassium hydroxides included in a mass of said particles, the improvement which comprises maintaining at a temperature of about 70° to about 120° C. a mixture of sodium carbonate, potassium carbonate, sodium hydroxide, potassium hydroxide and water, said mixture containing sodium carbonate in the form of solid particles and about 40 to about 60 per cent. of a mixture of sodium and potassium hydroxides, of which latter mixture about 40 to about 60 per cent. is sodium hydroxide, filtering off the solid sodium carbonate at a temperature of about 50° to about 150° C., applying suction to one side of the resulting filter-cake to withdraw liquid therefrom, and applying dry steam to the other side of said filter-cake while withdrawing liquid and while maintaining the filter-cake at a temperature of about 70° to about 120° C.

17. In the separation of solid particles or crystals of sodium carbonate from an aqueous solution containing sodium and potassium hydroxides included in a mass of said particles, the improvement which comprises maintaining a mixture of sodium carbonate, potassium carbonate, sodium hydroxide, potassium hydroxide and water at a temperature of about 70° to about 120° C. for about 6 to about 12 hours, said mixture containing sodium carbonate in the form of solid particles and about 40 to about 60 per cent. of a mixture of sodium and potassium hydroxides of which latter mixture about 40 to about 60 per cent. is sodium hydroxide, filtering off the solid sodium carbonate at a temperature of about 70° to about 120° C., applying suction to one side of the resulting filter-cake to withdraw liquid therefrom, and applying dry steam to the other side of said filter-cake while maintaining the filter-cake at a temperature of about 70° to about 120° C.

18. The process which comprises causing sodium carbonate to separate from an aqueous caustic alkali solution thereof in the form of solid particles containing not more than one molecule of water per molecule of sodium carbonate, separating the resulting solid particles from said solution while maintaining temperature conditions adapted to keep the sodium carbonate in said form, and displacing sodium carbonate solution from the resulting mass of separated solid particles by water supplied in the form of steam while maintaining said mass at an elevated temperature.

19. The process which comprises concentrating an aqueous solution of sodium carbonate and caustic alkali to produce a precipitate of sodium carbonate while maintaining the solution at a temperature not less than the lowest temperature at which sodium carbonate is capable of existing in the form of a solid containing not more than one molecule of water per molecule of sodium carbonate in stable equilibrium with a solution having the composition of said solution, separating said precipitate of sodium carbonate from the mother-liquor while maintaining the mixture at a temperature not less than said lowest temperature, forming the separated precipitate into a pervious sheet, applying a greater pressure to one side of said sheet than to the other side, withdrawing liquid from said sheet and applying dry steam to the side of said sheet under the greater pressure while maintaining said separated precipitate at a temperature not less than the lowest temperature at which sodium carbonate is capable of existing in the form of a solid containing not more than one molecule of water per molecule of sodium carbonate in stable equilibrium with a solution having the composition of residual solution remaining in said separated precipitate.

20. The process which comprises concentrating an aqueous solution containing sodium carbonate and sodium and potassium hydroxides to produce a precipitate of sodium carbonate in the form of solid particles by evaporating said solution while maintaining a temperature above the lowest temperature at which sodium carbonate is capable of existing in the form of a solid containing less than one molecule of water per molecule of sodium carbonate in stable equilibrium with a solution having the composition of said solution, maintaining the resulting mixture at a temperature above said lowest temperature, to complete the precipitation of the sodium carbonate, filtering off the precipitated sodium carbonate from the mother-liquor while maintaining the mixture at a temperature above said lowest temperature, applying a greater pressure to one side of the resulting-filter-cake than to the other side of said filter-cake, and applying dry steam to the side under the greater pressure while removing liquid from said filter-cake and while maintaining said filter-cake at a temperature above the lowest temperature at which sodium carbonate is capable of existing in the form of a solid containing less than one molecule of water per molecule of sodium carbonate in stable equilibrium with a solution having the composition of residual solution remaining in said filter-cake.

21. The process which comprises evaporating an aqueous solution of sodium carbonate, potassium carbonate, and a mixture of sodium and potassium hydroxides, said mixture containing about 40 to about 60 per cent. of sodium hydroxide, by heating said solution under subatmospheric pressure at a temperature of about 70° to about 120° C. to precipitate sodium carbonate, maintaining the resulting mixture at a temperature of about 70° to about 120° C. to complete the precipitation of the sodium carbonate, filtering off the precipitated sodium carbonate with the aid of suction while maintaining the mixture at a temperature of about 70° to about 120° C., and applying dry steam to said filter-cake while continuing the suction and while maintaining the filter-cake at a temperature of about 70° to about 120° C.

22. In the separation of solid particles or crystals of sodium carbonate from aqueous sodium carbonate solution adhering to said particles, the improvement which comprises displacing aqueous sodium carbonate solution from a mass of solid particles of sodium carbonate, having said solution adhering thereto, by means of steam while maintaining the sodium carbonate at an elevated temperature at which hydrated sodium carbonate containing more water of crystallization than corresponds to the formula $Na_2CO_3.H_2O$ is unstable in contact with a solution of sodium carbonate.

23. In the separation of an anhydrous solid crystalline sodium carbonate from a mixture of the same with a solution of sodium carbonate, the improvement which comprises rotating a drum filter while maintaining a portion of the surface of said filter submerged in a mixture of said anhydrous sodium carbonate crystals and a solution of the same, applying a vacuum to the interior of said filter to deposit on the submerged portion of the filter surface a layer of said anhydrous sodium carbonate crystals which by rotation of the filter drum is drawn from beneath the surface of said mixture and maintaining an atmosphere of steam in contact with said layer of said anhydrous sodium carbonate crystals while it is on said filter after emergence from the mixture of crystals and solution.

JOHN STUART STEVENSON.